April 23, 1968

G. C. FOSS ET AL 3,379,536

PIE CRUST PACKAGE

Filed July 15, 1964

INVENTORS:
GERALD C. FOSS
NORMAN D. WEAVER
WILLIAM C. HURLEY

BY Gravely, Lieder & Woodruff
ATTORNEYS.

United States Patent Office 3,379,536
Patented Apr. 23, 1968

3,379,536
PIE CRUST PACKAGE
Gerald C. Foss, Norman D. Weaver, and William C. Hurley, Greenville, Ill., assignors to Pet Incorporated, a corporation of Delaware
Filed July 15, 1964, Ser. No. 382,784
5 Claims. (Cl. 99—172)

ABSTRACT OF THE DISCLOSURE

A pie crust package having a plurality of pie shells with crusts therein held in assembled relation by means of a clear plastic member dish-shaped to conform to the shape of the uppermost pie pan and having a downwardly depending flange with circular grooves to engage the peripheral edges of the pie shells and retain the pie shells in assembled spaced relation.

---

The present invention relates to a pie crust package and specifically relates to a pie crust package in which a plurality of crumb filled pie pans are retained in nested condition by a single substantially rigid retainer member.

There are many devices and packages for packaging completed pie shells for consumer use. However, because of costs present marketing techniques dictate that a plurality of pie shells be packaged in a single package. Furthermore, when crumb pie crusts are packaged, it is essential that the crumb filling be protected. It also is important that the consumer be able to remove one of the shells from the protective cover and reuse the cover to protect the remaining shell or shells until these are used. Normally, the shells must be refrigerated and it is desirable that a moisture impervious protection be available to protect the crust from moisture, etc. which occasionally collects on articles which are refrigerated.

Therefore, one of the principle objects of the present invention is to provide a pie crust package in which a plurality of flanged pie pans having crusts therein are held in assembled nested condition by a single retainer member.

Another object of the present invention is to provide a pie crust package having a plurality of pie shells which may be removed one by one from a protective member without destroying the integrity of the protection afforded the remainder of the pie shells by the member.

Another object of the present invention is to provide a pie crust package having a clear plastic retainer member holding a plurality of nested pie shells in assembled condition with a bag covering the entire assembly during shipping and storage on the grocer's shelves.

These and other objects and advantages will become apparent hereinafter.

The present invention comprises a pie shell package wherein a plurality of nested pie crust filled pie pans are protected and held in nested condition by a unitary substantially rigid member engaging the peripheral edges of the pie pan flanges, the pie pans being individually removable from the member without destroying the integrity of the protection available to the remaining pie shells. The present invention further comprises the article and package hereinafter described and claimed.

In the drawings, wherein like numbers refer to like parts wherever they occur:

Figure 1:
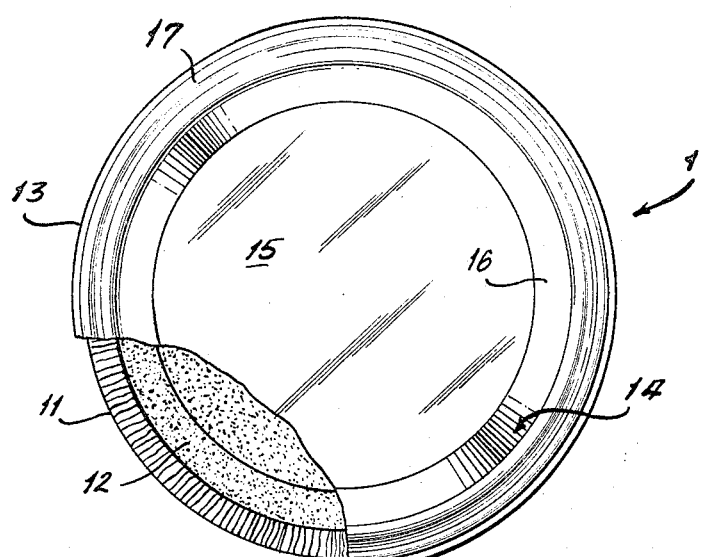
FIG. 1 is a partially broken plan view of the present pie shell package.
Figure 2:
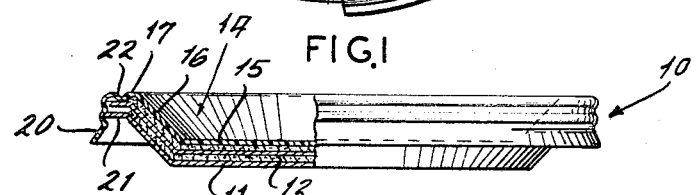
FIG. 2 is a side elevation partly in section of the present package.
Figure 3:
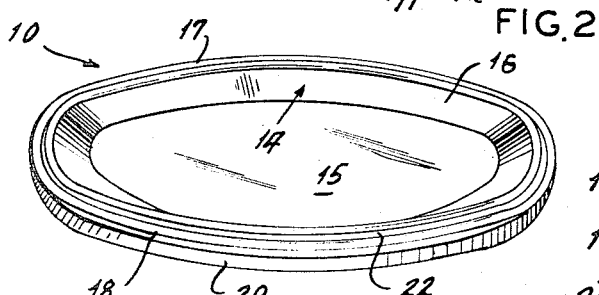
FIG. 3 is a perspective view of the holder member.
Figure 5:
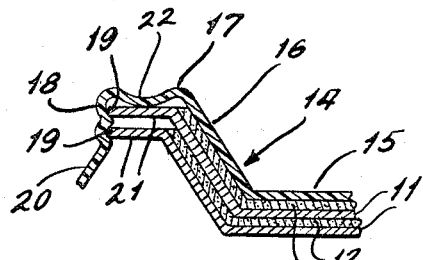
FIG. 5 is an enlarged fragmentary sectional view showing the details of the connection between the retainer member and the pie pan flanges.
Figure 4:
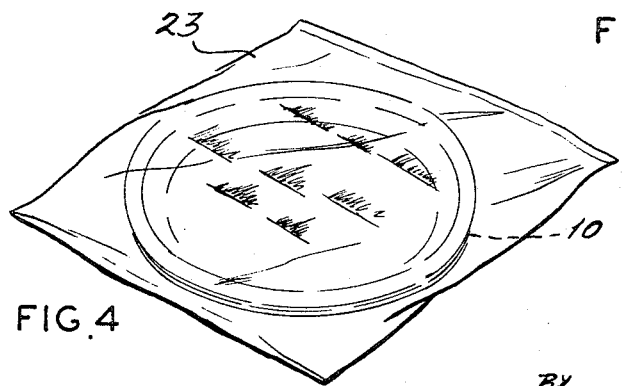
FIG. 4 is a perspective member showing a pie shell package positioned in a sealed overwrap bag.

The present invention includes a pie crust package 10 composed of a plurality of dish-shaped pie pans 11 (which conventionally are aluminum foil pans), crumb pie crusts 12 formed in the dish-shaped portion of the pie pans 11 (such as heat fused graham cracker pie crusts), and a unitary protective and retainer member 13 which holds the pie pans 11 in assembled condition.

The retainer member 13 preferably is a rigid clear plastic member having a dish-shaped portion 14 which includes a flat bottom 15 and an inverted frusto-conical side wall 16 connecting the bottom 15 with a grooved top wall 17. The top wall 17 extends outwardly from the free edge of the side wall 16 and is joined to a downwardly depending cylindrical end wall 18 which is provided with spaced annular grooves 19 and an outwardly inclined depending skirt 20 beneath the lowermost annular groove 19. The grooves 19 engage the peripheral edges of the pie pan flanges 21 to hold the pie pans 11 in nested prepositioned assembly.

The downwardly formed groove 22 in the top wall 17 spaces the top of the retainer member 13 from the top pie pan flange 21 and correspondingly spaces the dish-shaped portion 14 from the uppermost pie pan 11 approximately the thickness of the pie crust 12. The dish-shaped portion 14 is moisture impervious and protects the uppermost pie crust 12 from any condensate or drippings that may fall on the package 10 during refrigeration. Furthermore, since the dish-shaped portion 14 is rigid, it affords physical protection to the crumb pie crust 12 during shipping and storage. Graham cracker pie crusts are notoriously weak structurally and tend to disintegrate and crumble unless protected.

The cylindrical side wall 18 with the outwardly flared skirt 20 allows the lowermost pie pan 11 to be removed from the retaining member 13 without disturbing the integrity of the package 10 or the protection afforded by the retaining member 13 to the remaining pie shells. Since the retaining member 13 preferably is a clear plastic, it allows the consumer to readily view the contents of the uppermost pie pan 11. This is advantageous since most consumers are reluctant to buy that which they cannot actually see.

A polyethylene overwrap 23 is positioned around the assembled pie package 10 and has the usual advertising, etc. printed thereon. The purpose of the overwrap 23 is to protect the package 10 from dust and the like and to seal the package 10 against drying and to keep the contents fresh.

Thus, it is apparent that a pie crust package having all the objects and advantages sought therefor has been provided by the present invention.

This invention is intended to cover all changes and modifications of the examples of the invention herein chosen for purposes of the disclosure, which do not constitute departures from the spirit and scope of the invention.

What is claimed is:

1. A pie crust package comprising
   (a) a plurality of nested pie pans having frusto-conical shapes with closed bottoms and outwardly extending flanges around the open ends of said pans,
   (b) a pie crust positioned in each of the pie pans,
   (c) an integral one piece substantially rigid cover and fastening member releasably holding said pie pans in assembled condition, said member conforming to the shape of and being in juxtaposition to the uppermost pie crust, said member including a top edge engaging the outwardly extending flange of the uppermost pie pan, means engaging the said flange spacing the member from the inner surface of the pie pan approximately the thickness of the pie crust, and a downwardly depending skirt having a plurality of annular grooves engaging and retaining the peripheral edges of the pan flanges in assembled stacked condition.

2. The structure of claim 1 wherein the skirt includes an outwardly flared lower edge to facilitate individual removal of the nested pie pans from said retainer member without disturbing the integrity of the package.

3. The structure of claim 2 including a sealed overwrap loosely enclosing the cover member and the crust filled pie pans to protect the crusts from moisture loss.

4. A pie crust package comprising
 (a) a plurality of pie pans having frusto-conical shapes with closed bottoms and outwardly extending flanges around the open ends of said pans,
 (b) an adhered together crumb pie crust deposited and firmly positioned in each of the pie pans,
 (c) an integral substantially rigid one piece cover and fastening member releasably retaining said pie pans in assembled nested condition, said member having
  (1) a frusto-conical inner surface conforming to the shape of the pie crust in the topmost pie pan,
  (2) a flat base in the small end of said frustum conforming and in juxtaposition to the said pie crust,
  (3) a top surface extending outwardly from the large edge of the cone frustum and including an inwardly formed groove positioned adjacent to the top flange of the topmost pie pan spacing the member from the inner surface of the pie pan approximately the thickness of the pie crust,
  (4) a downwardly depending skirt having a plurality of annular grooves engaging and retaining the peripheral edges of the pan flanges in assembled stacked condition, and
  (5) an outwardly flared lower edge to facilitate individual removal of the nested pie pans from the retainer member.

5. The structure of claim 4 including a sealed overwrap loosely enclosing the cover member and the crust filled pie pans.

References Cited

UNITED STATES PATENTS

| | | | |
|---|---|---|---|
| 2,032,351 | 3/1936 | Chaplin | 206—65 |
| 2,691,337 | 10/1954 | Forrest. | |
| 2,829,057 | 4/1958 | Voelker | 99—172 |
| 3,190,758 | 6/1965 | Hauf | 99—172 |

RAYMOND N. JONES, *Primary Examiner.*